United States Patent
Korhonen et al.

(10) Patent No.: US 10,182,312 B1
(45) Date of Patent: Jan. 15, 2019

(54) METHOD AND SYSTEM FOR PROVIDING INFORMATION BASED ON LOCATION OF USER-DEVICE

(71) Applicant: Beemray Oy, Turku (FI)

(72) Inventors: Juha Korhonen, Turku (FI); Tatu Salminen, Turku (FI)

(73) Assignee: BEEMRAY OY, Turku (FI)

( * ) Notice: Subject to any disclaimer, the term of this patent is extended or adjusted under 35 U.S.C. 154(b) by 0 days.

(21) Appl. No.: 15/861,240

(22) Filed: Jan. 3, 2018

(51) Int. Cl.
*H04W 4/021* (2018.01)
*H04W 4/23* (2018.01)

(52) U.S. Cl.
CPC .......... *H04W 4/021* (2013.01); *H04W 4/23* (2018.02)

(58) Field of Classification Search
CPC ................ H04W 4/021; H04W 4/23
See application file for complete search history.

(56) References Cited

U.S. PATENT DOCUMENTS

| 8,626,187 B2 * | 1/2014 | Grosman | H04M 1/72572 |
| | | | 455/404.2 |
| 9,432,807 B2 * | 8/2016 | Kern, Jr. | H04W 4/021 |
| 2015/0346968 A1 * | 12/2015 | Johnson | G01C 21/00 |
| | | | 715/771 |
| 2018/0033244 A1 * | 2/2018 | Northrup | H04W 4/21 |
| 2018/0184244 A1 * | 6/2018 | Bestor | H04W 4/022 |
| 2018/0192243 A1 * | 7/2018 | Cornwall | H04W 4/022 |

* cited by examiner

*Primary Examiner* — Christopher M Brandt
(74) *Attorney, Agent, or Firm* — Ziegler IP Law Group, LLC

(57) ABSTRACT

A method and a system for providing information based on a location of a user-device, the user-device being communicably coupled to a server arrangement. The method includes (i) detecting a first location of the user-device; (ii) creating a first geofence around the first location; (iii) receiving the first location from within the first geofence, wherein the user-device transmits the first location once from within the first geofence; (iv) providing first set of information to the user-device based upon the first location thereof; (v) determining change in location of the user-device from the first location to a second location, the second location lying outside the first geofence, wherein a second geofence is created around the second location, further wherein the user-device transmits the second location once from within the second geofence; and (vi) providing second set of information to the user-device based upon the second location thereof.

18 Claims, 3 Drawing Sheets

METHOD AND SYSTEM FOR PROVIDING INFORMATION BASED ON LOCATION OF USER-DEVICE

TECHNICAL FIELD

The present disclosure relates generally to information management; and more specifically, to methods and systems for providing information based on a location of a user-device.

BACKGROUND

In recent times, the incorporation of location and navigation technology, such as global positioning systems (GPS) into mobile phones and similar wireless portable devices has created a class of "location-aware" devices that allow for determining location thereof. Such global positioning systems (GPS) facilitate the location of the wireless portable devices to be pinpointed. In other words, users of the wireless portable devices can often be located to an acceptable degree of accuracy.

Conventionally, such determination of the location of the wireless portable devices provides commercial enterprises (for example, such as cloth merchants, tour operators, cab operators and the like) with opportunities to offer location-specific information (for example, such as advertisements of products and/or services) directly to users of the wireless portable devices. For instance, the commercial enterprises may receive a location of a wireless portable device. Based on the received location of the wireless portable device, the commercial enterprises can identify and communicate an appropriate location-specific product and/or service advertisement to a user of such a wireless portable device. Thus, the commercial enterprises could target their advertisements according to the location of the users, in order to make advertising more relevant and valuable. In one example, when the user is determined to be in vicinity of a particular commercial enterprise (for example, such as a cloth merchant), a message (for example, in audio or video format) advertising clothing products offered by that cloth merchant, may be sent to the wireless portable device of the user.

However, providing information to the users of the wireless portable devices using such techniques has certain limitations. For example, the wireless portable devices continuously transmit their locations at predetermined intervals to a central processing device (for example, such as a server). Such continuous transmission of the locations of the wireless portable devices results in high battery consumption thereof since frequent GPS calls between the wireless portable devices and the central processing device are required to calculate the aforesaid locations. Furthermore, such frequent GPS calls require a constant network connection to be maintained between the wireless portable devices and the central processing device. Moreover, maintaining such a constant network connection leads to higher network usage and privacy concerns for the users of the wireless portable devices.

SUMMARY

The present disclosure seeks to provide a method for providing information based on a location of a user-device. The present disclosure also seeks to provide a system for providing information based on a location of a user-device. The present disclosure seeks to provide a solution to the existing problem of high battery consumption and heavy network usage of the user-device, in existing equipment for providing location-based information to the user-device. An aim of the present disclosure is to provide a solution that overcomes at least partially the problems encountered in the prior art, and provides a simple, robust, reliable and efficient method and system for providing information based on the location of the user-device.

In one aspect, an embodiment of the present disclosure provides a method for providing information based on a location of a user-device, the user-device being communicably coupled to a server arrangement, the method comprising:
(i) detecting a first location of the user-device;
(ii) creating a first geofence around the first location;
(iii) receiving the first location from within the first geofence, wherein the user-device is operable to transmit the first location once from within the first geofence;
(iv) providing a first set of information to the user-device based upon the first location of the user-device;
(v) determining a change in location of the user-device from the first location to a second location, the second location lying outside the first geofence, wherein a second geofence is created around the second location, further wherein the user-device is operable to transmit the second location once from within the second geofence; and
(vi) providing a second set of information to the user-device based upon the second location of the user-device.

In another aspect, an embodiment of the present disclosure provides a system for providing information based on a location of a user-device, the system comprising:
the user-device; and
a server arrangement communicably coupled to the user-device, wherein the server arrangement is configured to:
detect a first location of the user-device;
create a first geofence around the first location;
receive the first location from within the first geofence, wherein the user-device is configured to transmit the first location once from within the first geofence;
provide a first set of information to the user-device based upon the first location of the user-device;
determine a change in location of the user-device from the first location to a second location, the second location lying outside the first geofence, wherein a second geofence is created around the second location, further wherein the user-device is operable to transmit the second location once from within the second geofence; and
provide a second set of information to the user-device based upon the second location of the user-device.

Embodiments of the present disclosure substantially eliminate or at least partially address the aforementioned problems in the prior art, and enables efficient provision of information based on the location of the user-device, whilst reducing battery consumption and network usage thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
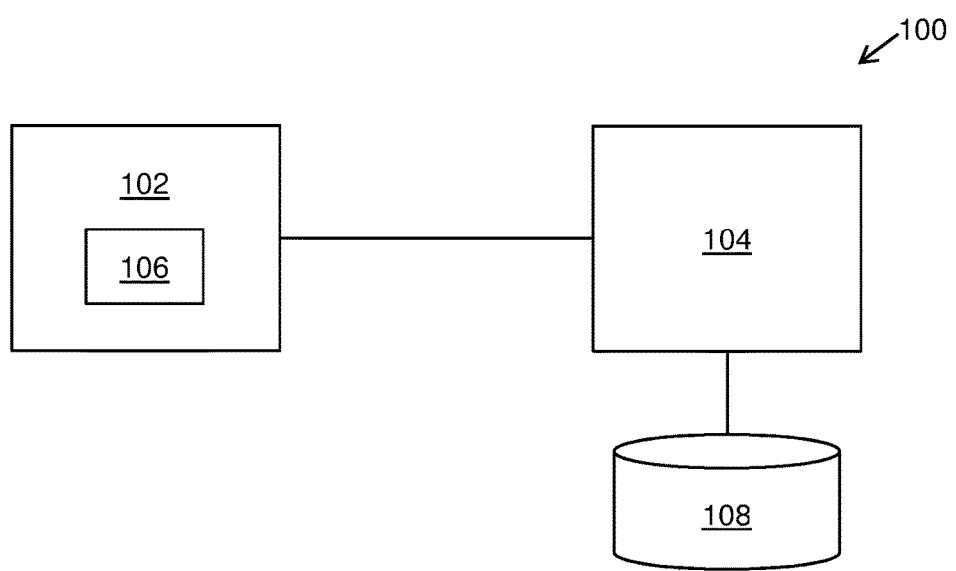
FIG. 1 is a schematic block diagram of architecture of a system for providing information based on a location of a user-device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for providing information based on a location of a user-device, the user-device being communicably coupled to a server arrangement, the method comprising:

(i) detecting a first location of the user-device;
(ii) creating a first geofence around the first location;
(iii) receiving the first location from within the first geofence, wherein the user-device is operable to transmit the first location once from within the first geofence;
(iv) providing a first set of information to the user-device based upon the first location of the user-device;
(v) determining a change in location of the user-device from the first location to a second location, the second location lying outside the first geofence, wherein a second geofence is created around the second location, further wherein the user-device is operable to transmit the second location once from within the second geofence; and
(vi) providing a second set of information to the user-device based upon the second location of the user-device.

In another aspect, an embodiment of the present disclosure provides a system for providing information based on a location of a user-device, the system comprising:

the user-device; and
a server arrangement communicably coupled to the user-device, wherein the server arrangement is configured to:
detect a first location of the user-device;
create a first geofence around the first location;
receive the first location from within the first geofence, wherein the user-device is configured to transmit the first location once from within the first geofence;
provide a first set of information to the user-device based upon the first location of the user-device;
determine a change in location of the user-device from the first location to a second location, the second location lying outside the first geofence, wherein a second geofence is created around the second location, further wherein the user-device is operable to transmit the second location once from within the second geofence; and
provide a second set of information to the user-device based upon the second location of the user-device.

The present disclosure provides the aforementioned method and the aforementioned system for providing information based on a location of a user-device. The system described herein allows for transmission of the location of the user-device once from within a given geofence. Therefore, such transmission of the location of the user-device results in low battery consumption of the user-device. Moreover, network connection between the user-device and the server arrangement is required one time when the user-device lies within the given geofence, thereby leading to low network usage of the user-device. Furthermore, by transmitting the location of the user-device once, privacy of a user of the user-device is also maintained. It will be appreciated that the method and system described herein are simple to implement, robust, and efficient in provision of information based on the location of the user-device.

As mentioned previously, the information is provided based on the location of the user-device. Throughout the present disclosure, the term "information" used herein relates to description and/or data content of a product and/or a service. Optionally, the information includes marketing data content (for example, such as advertisements) of the products and/or the services associated with a specific location. For example, a marketing/endorsing data content provided to a user of the user-device located at a location "XYZ" may be a commercial endorsement of a hotel "ABC" that is also located in the geographical location "XYZ". It will be appreciated that location of the user-device relates to geographical coordinates of the user-device.

In one embodiment, the information provided by the system is in textual format. In another embodiment, the information is provided in image format by the system. In another embodiment, the information is provided in audio format by the system. In an alternate embodiment, the information is provided in video format by the system. In yet another embodiment, the information is provided as a combination of textual, image, audio or video format.

Optionally, the user-device is a portable device. In such an instance, the user-device is capable of being moved from one location to another. Alternatively, optionally, the user-device is fixed in a portable equipment/vehicle. In such an instance, the portable equipment/vehicle is capable of being moved from one location to another, thereby, moving the user-device. In an embodiment, the user-device may be hardware, firmware, or a combination of these operable to receive the information. Optionally, the user-device includes a display unit for displaying the information to the user. Examples of the user-device include, but are not limited to, a smart-phone, a tablet computer, a laptop computer, a personal digital assistant, a car-phone, a carputer.

Optionally, the user-device is communicably coupled to the server arrangement via a wired network, a wireless network, or any combination thereof. Examples of the network between the user-device and the server arrangement include, but are not limited to, Local Area Networks (LANs), Wide Area Networks (WANs), radio network, Internet, radio networks, and telecommunication networks.

Furthermore, the term "server arrangement" used herein relates to a structure and/or module that include programmable and/or non-programmable components configured to store, process and/or share information. In an example, the server arrangement may include components such as a memory unit, a processor, a network adapter and the like, to store, process and/or share the information. Optionally, the server arrangement could be implemented as a single server and/or as two or more servers operating in a parallel and/or in a distributed architecture.

As mentioned previously, the first location of the user-device is detected. Throughout the present disclosure, the term "first location" used herein relates to geographical coordinates of the user-device when communication is established between the user-device and the server arrangement, for the first time. In an example, the first location may be a location the user-device when the user-device is switched on for the first time. Optionally, the user-device comprises a global positioning tracking unit for detecting the first location of the user-device. Notably, the global positioning tracking unit relates to specialized equipment operable to detect the location of the user-device. It will be appreciated that the detection of the first location of the user-device by the server arrangement relates to the aforesaid detection of the first location by the system comprising the user-device and the server arrangement.

Optionally, the global positioning tracking unit includes a signal reception module (namely, a global positioning system receiver module). Moreover, optionally, the signal reception module is a satellite signal reception module operable to receive a signal, indicating the location of the user-device, from a satellite. The global positioning tracking unit further comprises a signal transmission module (namely, a global positioning system transmitter module) operable to transmit the detected first location to the server arrangement.

Furthermore, as mentioned previously, the first geofence is created around the first location. Specifically, the server arrangement is operable to create the first geofence around the first location. Throughout the present disclosure, the term "first geofence" used herein relates to a virtual geographic boundary created around the first location of the user-device. Optionally, the processor of the server arrangement is operable to execute a software application thereon to create the first geofence around the first location of the user-device. In an embodiment, the software application relates to a device-functionality software and/or an operating system software configured to execute other application programs and interface between the application programs and associated hardware (for example, such as the server arrangement, the user-device and so forth). Moreover, optionally, the software application is a computing platform for executing plurality of computer programs or algorithms for acquiring and processing the information received from other programmable and non-programmable components, such as the global positioning tracking unit.

Optionally, an area of the first geofence is defined by an operator of the server arrangement. Moreover, optionally, the operator may define the area of the first geofence based on the surroundings of the user-device. In one example, if the first location of the user-device is in a market place, the operator may define the area of the first geofence equivalent to the area of the market place. In another example, if the first location of the user-device is in an overcrowded market place, the operator may define the area of the first geofence less than the area of the market place. It will be appreciated that the area of the first geofence is also defined based on a speed at which the user-device is moving. Notably, the speed of the user-device is determined by the analyzing a speed of the user carrying the user-device. In an example, the user carrying the user-device, is in a car moving at a high speed. In such a case, speed of the user-device is also high; therefore, the operator may define a large area for the first geofence as the fast moving car may cover a greater distance in short duration of time. In another example, the user, carrying the user-device, is walking along a road at a slow speed. In such a case, speed of the user-device is also slow; therefore, the operator may define a small area for the first geofence as the slow moving user may cover a smaller distance in long duration of time.

Optionally, a shape of the first geofence is one of: a circle, an ellipse, a polygon, a freeform shape. In an embodiment, the shape of the first geofence is defined by the operator of the server arrangement, based upon a shape and/or geography of the surroundings of the first location. In an example, the first location of a user-device is detected to be inside a circular-shaped shopping mall. In such an example, the operator may define a circular first geofence around the first location of the user-device. In another example, the first location of a user-device is detected inside a park such that the shape of the park is freeform. In such an example, the operator may define a freeform shaped first geofence around the first location of the user-device. In another embodiment, the shape of the first geofence is defined by the software application based on surroundings of the first location.

As mentioned previously, the first location is received from within the first geofence, wherein the user-device is operable to transmit the first location once from within the first geofence. Specifically, once the first geofence is created, the global positioning tracking unit is operable to transmit the first location of the user-device from within the first geofence, via the network, to the server arrangement.

Beneficially, the global positioning tracking unit is operable to transmit the first location of the user-device from within the first geofence once so as to minimize battery and network usage. Thereafter, the server arrangement receives the first location from the global positioning tracking unit.

Optionally, the aforesaid system comprises a content database configured to store the information. The content database relates to a structured collection of advertisement content that can be created and/or stored in any type of data storage systems. Optionally, the content database is communicably coupled with the server arrangement wirelessly and/or in a wired manner. In an embodiment, the content database is operable to receive information from an external resource. The external resource relates to an entity that is operable to provide information required by the content database. For example, the external resource may be an entity that provides information for hotels located in various locations. In another embodiment, the content database is operable to receive information from plurality of external resources.

Optionally, the content database is operable to organise the information in a manner that a desired piece of data or record from the information is quickly selected. More optionally, the content database is operable to organise the information based upon different locations. Furthermore, optionally, the information related to the various geographical locations are organised in a manner such that at least one information is associated with at least one location. For example, the content database may be configured to group plurality information for hotels acquired from an external resource in a manner wherein information for hotels is associated with a specific location.

As mentioned previously, the first set of information is provided to the user-device based upon the first location of the user-device. Throughout the present disclosure, the term "first set of information" relates to data content of a product and/or a service associated with the first location of the user-device. The server arrangement is operable to receive the first location of the user-device and process the information, received from the content database, based upon the first location of the user-device. In an example, the server arrangement may receive the first location of the user-device from the global positioning tracking unit thereof, and may acquire the information related to car garages proximal to the first location from the content database. In such a case, the server arrangement employs a software application 'MNP' to generate structured collection of information related to the car garages in a manner such that the information is grouped based on the first location of the user-device. Thereafter, the server arrangement transmits the structured collection of information related to the car garages to the user-device.

Optionally, the information is further sorted based upon the first location of the user-device. Moreover, optionally, the first set of information received by the server arrangement is sorted based on the first location of the user-device. In an embodiment, the first set of information is sorted based upon the proximity to the first location within the first geofence. In an example, a first location of the user-device within the first geofence is "XYZ". The server arrangement is portable to sort the first set of information (for example, such as information of car garages) in such a manner so that the car garages nearest to the location "XYZ" are shown first. In another embodiment, the first set of information is sorted based on the historical data of the user of the user-device. It will be appreciated that the term "historical data" relates to a periodically stored data associated with the activity performed by the user around the first location within the first geofence. In such an embodiment, the historical data is stored in the memory unit of the server arrangement.

The change in location of the user-device from the first location to the second location is determined. The second location lies outside the first geofence, wherein the second geofence is created around the second location. Throughout the present disclosure, the term "second location" used herein relates to a geographical location of the user-device that lies outside the first geofence. The global positioning tracking unit is operable to detect the second location of the user-device. The transmitter of the global positioning tracking unit transmits the detected second location of the user-device to the server arrangement. Specifically, the user-device transmits the second location to the server arrangement when the second location user-device lies outside the first geofence. In an embodiment, the transmission of the second location is carried out only when the second location user-device lies outside the first geofence.

The server arrangement is further operable to create the second geofence around the received second location of the user-device. Throughout the present disclosure, the term "second geofence" used herein relates to a virtual geographic boundary created around the second location of the user-device. Optionally, the server arrangement is operable to execute the software application thereon to create the second geofence around the second location of the user-device.

Furthermore, the user-device is operable to transmit the second location once from within the second geofence. In operation, once the second geofence is created, the second location of the user-device from within the second geofence is transmitted to the server arrangement, via the network.

Optionally, an area of the second geofence is based upon at least one of: the second location, speed of the user-device, direction of the user-device. Moreover, optionally, the software application hosted on the processor of the server arrangement is operable to define the area of the second geofence. In an example, if the second location of the user-device is in a shopping mall, the software application may define an area of a second geofence equivalent to the area of the shopping mall. In another example, if the first location of the user-device is in an overcrowded market place (such that the movement of the user-device is slow); the software application may define an area of a second geofence less than the area of the market place.

It will be appreciated that the area of the second geofence is defined based upon the speed at which the user-device is moving. Notably, the speed of the user-device is determined by the analyzing the speed of the user, carrying the user-device. In an example, the user, carrying the user-device, is present in a car travelling at a high speed. In such a case, the speed of the user-device is also high; therefore, in such regards, the software application may define a large area for the second geofence as the fast moving car may cover a greater distance in short duration of time. In another example, the user, carrying the user-device, is walking along a road at a slow speed. In such a case, speed of the user-device is also slow; therefore, the software application may define a small area for the second geofence as the slow moving user may cover relatively lower distance in long duration of time.

Furthermore, optionally, the area of the second geofence is defined based upon the direction of the user-device in which it is moving. In such a case, the server arrangement may also receive the direction in which the user-device is moving. Based on the received direction, the software application creates the second geofence around the second location of the user-device. In an example, the user-device exits the first geofence and is moving in a north direction. In such an example, the server arrangement is operable to create the second geofence such that a diameter (or longest diagonal) of the second geofence aligns with the movement of the user-device. Beneficially, creating the second geofence is such a manner allows for the user-device to be in the second geofence for a longer duration of time and thereby reduces battery and network usage.

In an embodiment, the area of the second geofence is based upon the size of a predefined geofence. The term "predefined geofence" used herein relates to a default virtual geographical boundary around different kinds or landmarks. Examples of landmarks may include building, parks, monuments and the like. In such an embodiment, the server arrangement is notified when the user-device enters the predefined geofence. Optionally, the area of the second geofence is defined in such a manner that the second geofence do not overlaps the predefined geofence. Therefore, the area of the second geofence may be reduced or increased accordingly.

Optionally, predefined geofence are created by the software application automatically based on the historical data of the user. Alternatively, optionally, the second geofence is generated by the operator of the server arrangement. It will be appreciated that the predefined geofences are created at the time the software application is executed for a first time.

Optionally, a shape of the second geofence is one of: a circle, an ellipse, a polygon, a freeform shape. In an embodiment, the shape of the first geofence is defined by the software application based on surroundings of the first location. In such an embodiment, the software application determines the surroundings of the second location within the second geofence. In an example, the second location is detected inside a restaurant such that a shape of the restaurant is square. In such an example, the software application may define a square shaped first geofence around the second location of the user-device. In another embodiment, the shape of the second geofence is defined by the operator of the server arrangement.

Optionally, a center point of the second geofence lies on a perimeter of the first geofence. In an example, the second geofence may be circular in shape. In such an example, a center of the circle lies on the perimeter of the first geofence. Beneficially, creation of second geofence in such a manner ensures that the movement of the user-device would be inside the second geofence. Alternatively, optionally, a perimeter of the second geofence lies on the perimeter of the first geofence.

Furthermore, the second set of information is provided to the user-device based upon the second location of the user-device. Throughout the present disclosure, the term "second set of information" relates to data content of a product and/or a service associated with the second location of the user-device. The server arrangement is operable to receive the second location of the user-device and process the information, received from the content database, based upon the second location of the user-device. In an example, the server arrangement may acquire information related to corporate offices from the content database and a second location of the user-device from the global positioning tracking unit. In such a case, the server arrangement employs a software application 'MNP' to generate structured collection of information related to corporate offices in a manner such that the information is grouped based on the second location of the user-device. Thereafter, the server arrangement transmits the structured collection of information related to corporate offices to the user-device.

Optionally, the information is further sorted based upon the second location of the user-device. Moreover, optionally, the second set of information generated by the server arrangement is sorted based on the second location of the user-device. In an embodiment, the second set of information is sorted based upon the proximity to the second location within the second geofence. In an example, the second location of the user-device within the second geofence is "ABC". The server arrangement is portable to sort the second set of information (for example, such as information of car garages) in such a manner so that the car garages nearest to the location "ABC" are shown first. In another embodiment, the second set of information is sorted based on the historical data of the user of the user-device. It will be appreciated that the term "historical data" relates to a periodically stored data associated with the activity performed by the user around the second location within the second geofence.

It will be appreciated that the user-device is operable to transmit a third location of the user-device to the server arrangement when the location of the user-device lies outside the second geofence. Thereafter, the server arrangement creates a third geofence around the third location and provides a third set of information to the user-device based on the third location. Similarly, the server arrangement is operable to detect the subsequent locations of the user-device and create subsequent geofences around the subsequent locations of the user-device. Also, the server arrangement is operable to provide subsequent set of information to the user-device based on the subsequent location of the user-device.

In an example, the detected first location of the user-device may be in a shopping mall. In such an example, the server arrangement may create the first geofence around the first location of the user-device. The server arrangement may further receive the first location of the user-device and provide the first set of information to the user-device. The first set of information may include advertising content of the shops present in the shopping mall. When the user-device exits the first geofence i.e. the user-device may be outside the shopping mall, the software application, hosted on the processor of the server arrangement, is notified. The user-device then transmits the second location of the user-device to the server arrangement such that user-device is now located in hardware market. In such a case, the server arrangement may create the second geofence around the second location of the user-device. The server arrangement may provide the second set of information to the user-device. The second set of information may include advertising content of the hardware stores nearby. Thereafter, when the location of the user-device lies outside the second geofence, the server arrangement may receive the third location of the user-device and provide the third set of information to the user-device. Similarly, the user-device may transmit the fourth, fifth or sixth location to the server arrangement, whenever the location of the user-device exits a corresponding geofence. In such a manner, the server arrangement may also generate a fourth, fifth or sixth geofence around the fourth, fifth or sixth location of the user-device and provide the fourth, fifth or sixth set of information respectively.

Optionally, time-stamps are associated with the detection of the first and second locations of the user-device. In an embodiment, the server arrangement stores a time of receiving the first and second location in the memory unit. More optionally, time durations of existence of the user-device within the first and second geofences is calculated, based upon the time-stamps. In an example, if the user-device exits the first geofence at 12:00 hours and exits the second geofence at 16:00 hours, the server arrangement may calculate the existence of the user-device within the second geofence by subtracting the time-stamps of the first and second geofences. In above mentioned example, the server arrangement may calculate the time durations of existence of the user-device in second geofence by subtracting 12:00 from 16:00 which equals to four hours.

According to an embodiment, the user-device is operable to transmit the first location only once from within the first geofence. Likewise, the user-device may be operable to transmit the second location only once from within the second geofence. According to an embodiment, the system thus allows for transmission of the location of the user-device only once from within a given geofence. The user-device may transmit the second location to the server arrangement only when the second location user-device lies outside the first geofence. Moreover, network connection between the user-device and the server arrangement may be required only once when the user-device lies within the given geofence, thereby, leading to low network usage of the user-device. Furthermore, by transmitting the location of the user-device only once, privacy of a user of the user-device is also maintained and battery and network usage is minimized.

The present disclosure also relates to the system as described above. Various embodiments and variants disclosed above apply mutatis mutandis to the system.

Optionally, the system further comprises the content database configured to store the information. Optionally, the system comprises the global positioning tracking unit for detecting the first and second locations of the user-device. Optionally, the server arrangement is further configured to provide the first and second set of information to the user-device by sorting the information based upon the first and second locations of the user-device.

Optionally, the server arrangement is further configured to associate the time-stamps with the detection of the first and second locations of the user-device. Optionally, in this regard, the server arrangement is further configured to calculate time durations of existence of the user-device within the first and second geofences, based upon the time-stamps.

Optionally, in the system, the area of the first geofence is defined by an operator of the server arrangement. Optionally, in the system, the area of the second geofence is based upon at least one of: the second location, speed of the user-device, direction of the user-device. Optionally, in the system, the shape of the first geofence and a shape of the second geofence is one of: the circle, the ellipse, the polygon, the freeform shape. Optionally, in the system, the center point of the second geofence lies on the perimeter of the first geofence.

DETAILED DESCRIPTION OF THE DRAWINGS

Referring to FIG. 1, illustrated is a schematic block diagram of architecture of a system 100 for providing information based on a location of a user-device 102, in accordance with an embodiment of the present disclosure. As shown, the system 100 comprises the user-device 102 and a server arrangement 104. The server arrangement 104 is communicably coupled to the user-device 102. Furthermore, the user-device 102 optionally comprises a global positioning tracking unit 106 for detecting first and second locations of the user-device 102. The server arrangement 104 is configured to: detect the first location of the user-device 102; create a first geofence around the first location; receive the first location from within the first geofence, wherein the user-device 102 is configured to transmit the first location once from within the first geofence; provide first set of information to the user-device 102 based upon the first location of the user-device 102; determine a change in location of the user-device 102 from the first location to the second location, the second location lying outside the first geofence, wherein a second geofence is created around the second location, further wherein the user-device 102 is operable to transmit the second location once from within the second geofence; and provide second set of information to the user-device 102 based upon the second location of the user-device 102.

As shown, the system 100 optionally comprises a content database 108 configured to store the information.

Figure 2:
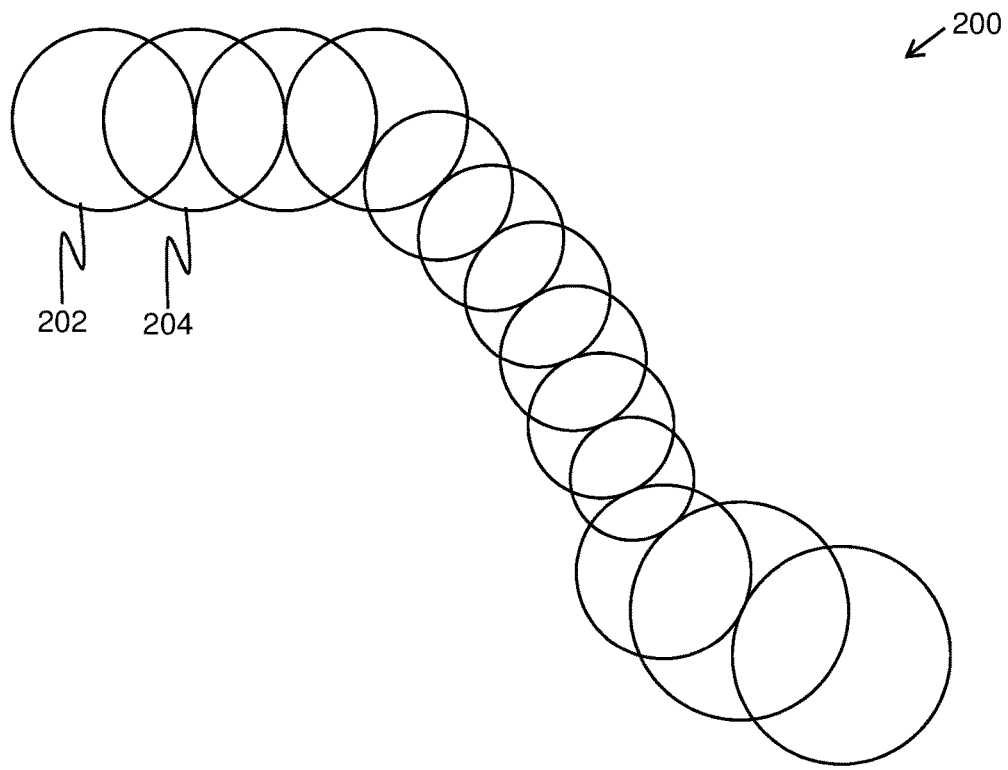
FIGS. 2 and 3 are exemplary illustrations of geofences including at least a first geofence and a second geofence, in accordance with different embodiments of the present disclosure.

Referring to FIG. 2, illustrated is an exemplary illustration of geofences 200 including at least a first geofence 202 and a second geofence 204, in accordance with an embodiment of the present disclosure. The first geofence 202 and the second geofence 204 are created around a first location and a second location respectively, of a user-device. As shown, a shape of the first geofence 202 and a shape of the second geofence 204 is a circle. Furthermore, an area of the geofences 200 is based upon at least one of: a location of the user-device, speed of the user-device, direction of the user-device. Furthermore, as shown, a center point of the second geofence 204 optionally lies on a perimeter of the first geofence 202.

Figure 3:
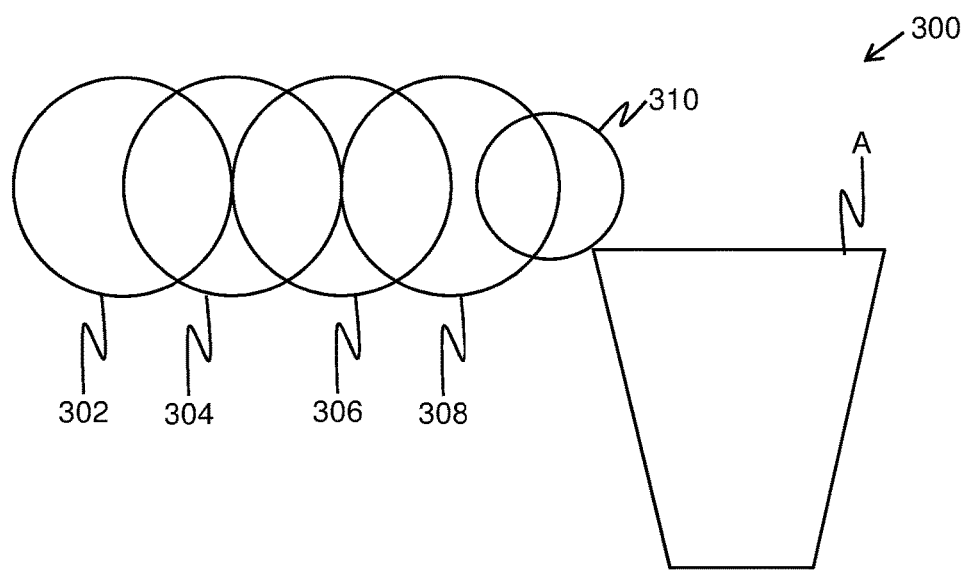

Referring to FIG. 3, illustrated is an exemplary illustration of geofences 300 including at least a first geofence 302 and a second geofence 304, in accordance with another embodiment of the present disclosure. The first geofence 302 and the second geofence 304 are created around a first location and a second location respectively, of a user-device. Furthermore, as shown, the geofences 300 include a third geofence 306, a fourth geofence 308 and a fifth geofence 310, that are created around a third location, a fourth location, and a fifth location respectively, of the user-device. The geofences 300 optionally include a predefined geofence A. Therefore, an area of the fifth geofence 310 is optionally based upon area and/or shape of the predefined geofence A to avoid overlapping therebetween.

It may be understood by a person skilled in the art that FIGS. 2 and 3 include simplified illustrations of geofences 200 and 300 for the sake of clarity only, which should not unduly limit the scope of the claims herein. The person skilled in the art will recognize many variations, alternatives, and modifications of embodiments of the present disclosure.

Figure 4:
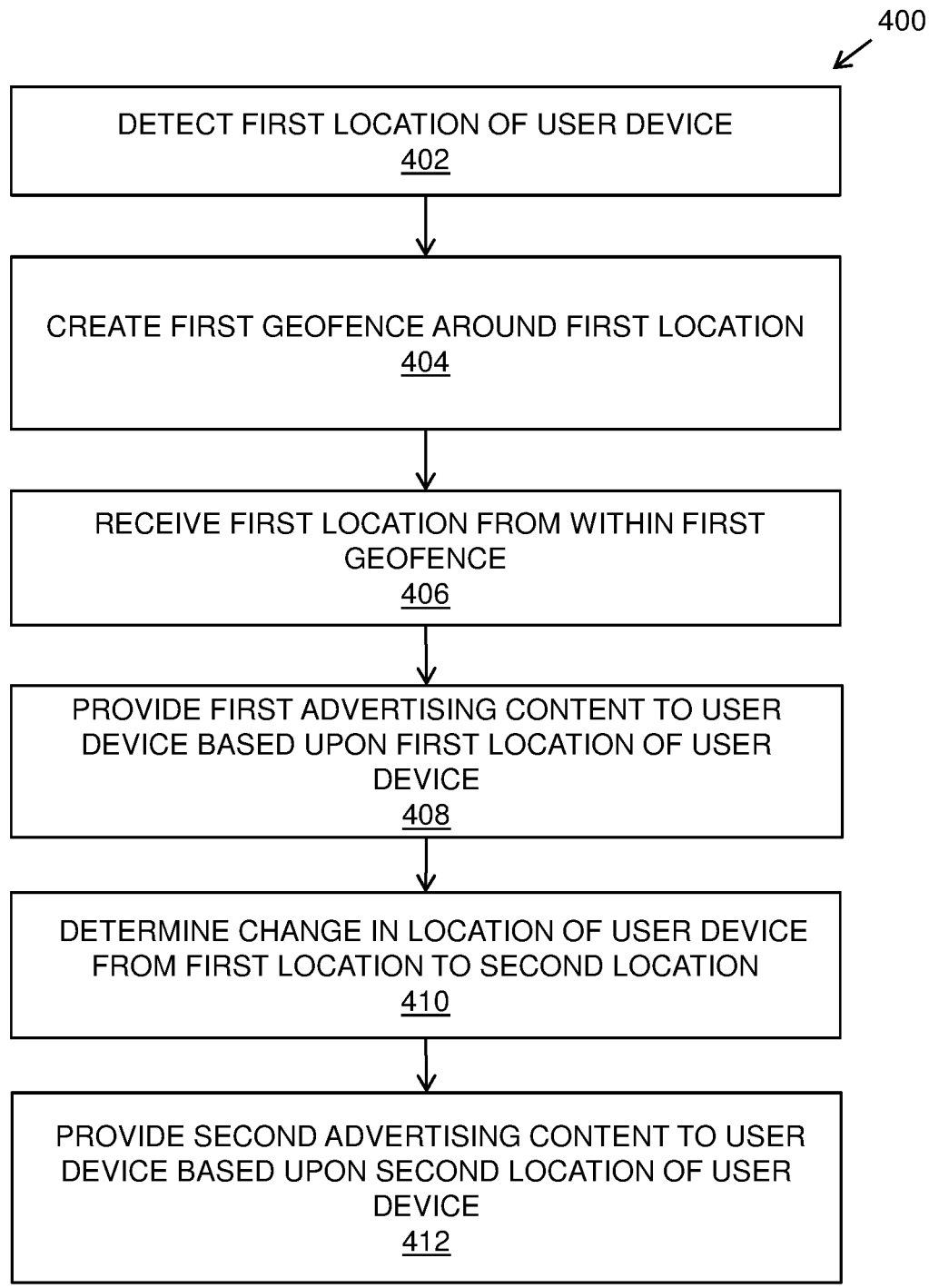
FIG. 4 is an illustration of steps of a method for providing information based on a location of a user-device, the user-device being communicably coupled to a server arrangement, in accordance with an embodiment of the present disclosure.

Referring to FIG. 4, illustrated are steps of a method 400 for providing information based on a location of a user-device, the user-device being communicably coupled to a server arrangement, in accordance with an embodiment of the present disclosure. As shown, at step 402, a first location of the user-device is detected. At step 404, a first geofence around the first location is created. At step 406, the first location from within the first geofence is received, wherein the user-device is operable to transmit the first location once from within the first geofence. At step 408, first set of information is provided to the user-device based upon the first location of the user-device. Furthermore, at step 410, a change in location of the user-device from the first location to a second location is determined, the second location lying outside the first geofence, wherein a second geofence is created around the second location, further wherein the user-device is operable to transmit the second location once from within the second geofence. At step 412, second set of information is provided to the user-device based upon the second location of the user-device.

The steps 402 to 412 are only illustrative and other alternatives can also be provided where one or more steps are added, one or more steps are removed, or one or more steps are provided in a different sequence without departing from the scope of the claims herein. As an example, in the method 400, an area of the first geofence is defined by an operator of the server arrangement. Additionally, in the method 400, an area of the second geofence is based upon at least one of: the second location, speed of the user-device, direction of the user-device. Moreover, in the method 400, a shape of the first geofence and a shape of the second geofence is one of: a circle, an ellipse, a polygon, a freeform shape. In another example, in the method 400, a center point of the second geofence lies on a perimeter of the first geofence. Furthermore, the method 400 comprises associating time-stamps with the detection of the first and second locations of the user-device. Additionally, in the method 400, providing the first and second set of information to the user-device comprises sorting the information based upon the first and second locations of the user-device. As another example, the method 400 comprises calculating time durations of existence of the user-device within the first and second geofences, based upon the time-stamps.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for providing information based on a location of a user-device, the user-device being communicably coupled to a server arrangement, wherein the method comprises:
   (i) detecting a first location of the user-device;
   (ii) creating a first geofence around the first location;
   (iii) receiving the first location from within the first geofence, wherein the user-device is operable to transmit the first location once from within the first geofence;
   (iv) providing a first set of information to the user-device based upon the first location of the user-device;
   (v) determining a change in location of the user-device from the first location to a second location, the second location lying outside the first geofence, wherein a second geofence is created around the second location, further wherein the user-device is operable to transmit the second location once from within the second geofence; and
   (vi) providing a second set of information to the user-device based upon the second location of the user-device.

2. A method according to claim 1, wherein an area of the first geofence is defined by an operator of the server arrangement.

3. A method according to claim 1, wherein an area of the second geofence is based upon at least one of: the second location, speed of the user-device, direction of the user-device.

4. A method according to claim 1, wherein a shape of the first geofence and a shape of the second geofence is one of: a circle, an ellipse, a polygon, a freeform shape.

5. A method according to claim 1, wherein a center point of the second geofence lies on a perimeter of the first geofence.

6. A method according to claim 1, wherein providing the first and second set of information to the user-device comprises sorting the information based upon the first and second locations of the user-device.

7. A method according to claim 1, wherein the method further comprises associating time-stamps with the detection of the first and second locations of the user-device.

8. A method according to claim 7, wherein the method further comprises calculating time durations of existence of the user-device within the first and second geofences, based on the time-stamps.

9. A system for providing information based on a location of a user-device, comprising:
   the user-device; and
   a server arrangement communicably coupled to the user-device, wherein the server arrangement is configured to:
   (i) detect a first location of the user-device;
   (ii) create a first geofence around the first location;
   (iii) receive the first location from within the first geofence, wherein the user-device is configured to transmit the first location once from within the first geofence;
   (iv) provide a first set of information to the user-device based upon the first location of the user-device;
   (v) determine a change in location of the user-device from the first location to a second location, the second location lying outside the first geofence, wherein a second geofence is created around the second location, further wherein the user-device is operable to transmit the second location once from within the second geofence; and
   (vi) provide a second set of information to the user-device based upon the second location of the user-device.

10. A system according to claim 9, wherein the system further comprises a content database configured to store the information.

11. A system according to claim 9, wherein the user-device comprises a global positioning tracking unit for detecting the first and second locations of the user-device.

12. A system according to claim 9, wherein an area of the first geofence is defined by an operator of the server arrangement.

13. A system according to claim 9, wherein an area of the second geofence is based upon at least one of: the second location, speed of the user-device, direction of the user-device.

14. A system according to claim 9, wherein a shape of the first geofence and a shape of the second geofence is one of: a circle, an ellipse, a polygon, a freeform shape.

15. A system according to claim 9, wherein a center point of the second geofence lies on a perimeter of the first geofence.

16. A system according to claim 9, wherein the server arrangement is further configured to provide the first and second set of information to the user-device by sorting the information based upon the first and second locations of the user-device.

17. A system according to claim 9, wherein the server arrangement is further configured to associate time-stamps with the detection of the first and second locations of the user-device.

18. A system according to claim 17, wherein the server arrangement is further configured to calculate time durations of existence of the user-device within the first and second geofences, based on the time-stamps.

* * * * *